Nov. 11, 1952     L. C. SANDERS     2,617,294
TRACTION DYNAMOMETER

Filed Oct. 27, 1950     3 Sheets-Sheet 1

INVENTOR.
LAWRENCE C. SANDERS
BY
*W. J. Eccleston*
ATTORNEY

INVENTOR.
LAWRENCE C. SANDERS

Nov. 11, 1952     L. C. SANDERS     2,617,294
TRACTION DYNAMOMETER

Filed Oct. 27, 1950     3 Sheets-Sheet 3

*INVENTOR.*
LAWRENCE C. SANDERS
BY
*ATTORNEY*

Patented Nov. 11, 1952

2,617,294

UNITED STATES PATENT OFFICE 2,617,294

TRACTION DYNAMOMETER

Lawrence C. Sanders, Seattle, Wash., assignor to the United States of America as represented by the Secretary of the Army Application October 27, 1950, Serial No. 192,558
1 Claim. (Cl. 73—144)

(Granted under the act of March 3, 1883, as amended April 30, 1928; 370 O. G. 757)

This invention if patented may be manufactured by or for the Government for governmental purposes without the payment to me of any royalty thereon.

The invention to be hereinafter described relates to a dynamometer.

The tensile stress or strain to which a ship's hawser may be subjected is a determining factor in its construction. Likewise such hawsers are made with known or predetermined tensile strength or ability to withstand stresses up to a given maximum. On the other hand, the strain on a hawser may easily exceed the maximum. To avoid this danger, various devices, equipment and apparatus have been developed for indicating the amount of stress being imposed at any time on the respective hawser. Generally speaking one well known and widely used such apparatus comprises a base, a frame work movable relatively to the base, a dynamometer actuated by movement of the frame and connection compelling movement of the frame by and in proportion with the varying tensile stresses and strains exerted on the hawser. One serious objection in many such constructions is the vibration of the indicator hand or needle.

The main objects of the present invention are to eliminate or minimize the above and other objections and provide a simple, efficient, compact, durable and low cost strain or stress-indicating mechanism or apparatus for determining and indicating hawser stress or strain at any desired time.

While the invention has been referred to in connection with hawsers, it will be obvious that it may be applied to determining and indicating similar strains and stresses in a wide range of other elongated flexible members such as cables, ropes, wires and the like.

In order to more clearly disclose the construction, operation and use of the invention, reference should be had to the accompanying drawings forming part of the present application. Throughout the several figures of the drawings like reference characters designate the same parts in the different views.

Figure 1:
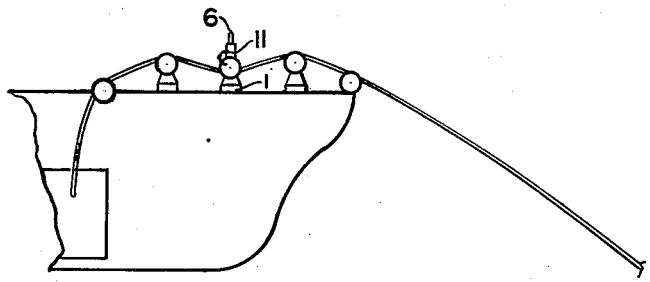
Fig. 1 is a diagrammatic view showing application of the invention to a hawser which is in tractional relation with the lower side of the pulley of the dynamometer shown mounted on the deck in the bow of a ship shown as a fragment.
Figure 4:
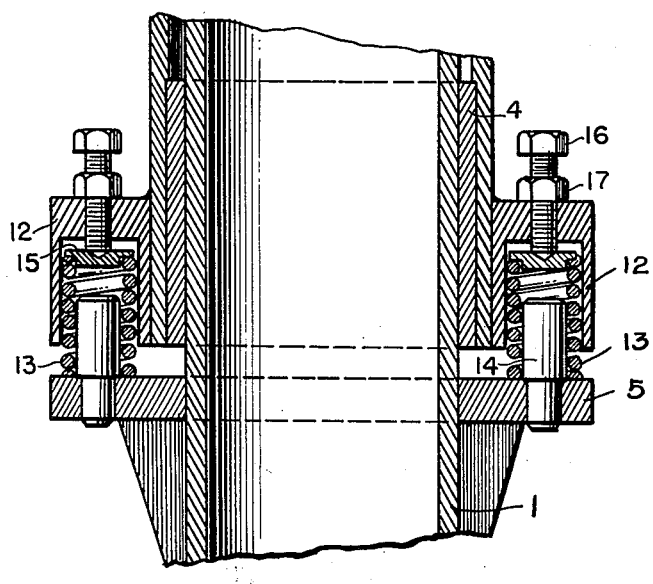
Fig. 4 is an enlarged fragmentary section showing the supporting springs and their mounts.
Figure 2:
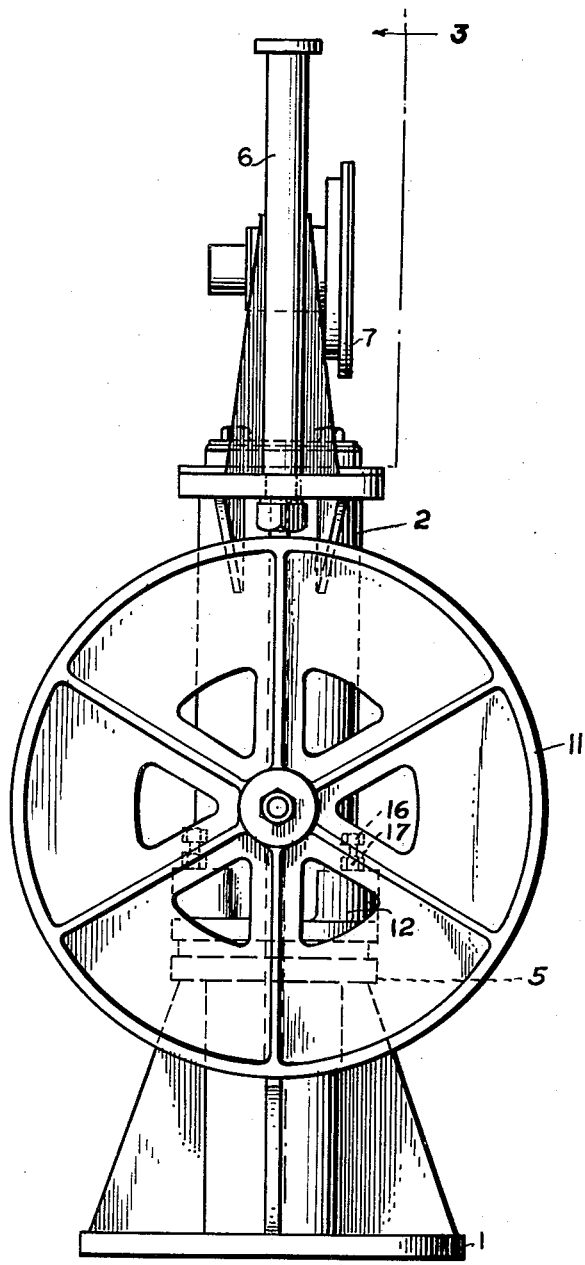
Fig. 2 is a side elevation of the dynamometer.
Figure 3:
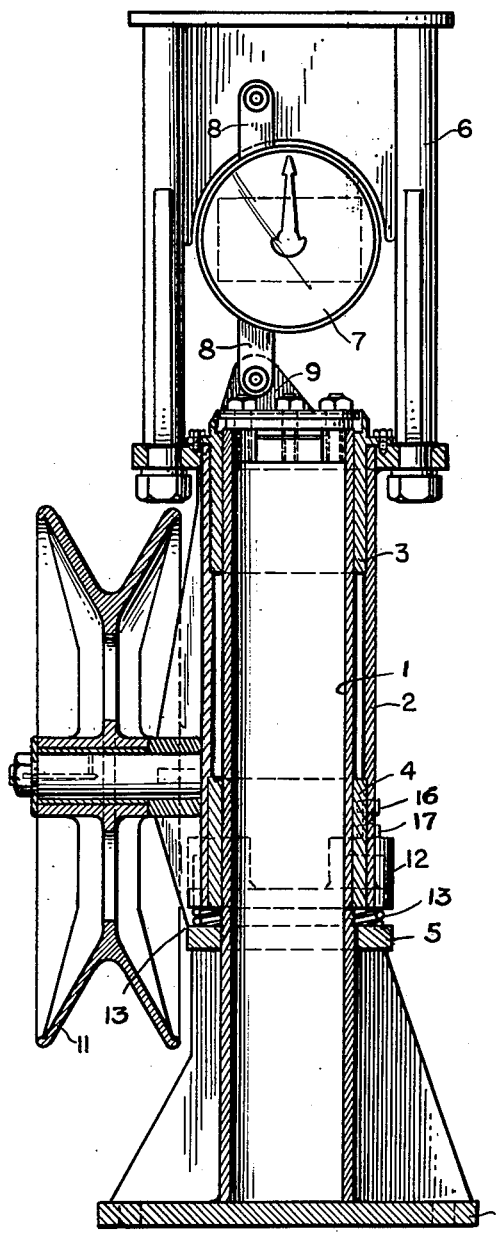
Fig. 3 is a vertical cross section on line 3—3 of Fig. 2, looking in the direction of the arrows, the upper portion being in elevation.

As shown in Fig. 1, the preferred location or position of the invention is such that the hawser, in a taut condition, will operate the invention to indicate existence of the predetermined maximum stress or strain which, logically, should be less than the danger load at which rupture is approximated.

On a suitable upright, tubular, supporting base 1, anchored or permanently fixed to the deck, is telescopically slidably mounted, and properly lubricated, a cooperating tubular sleeve 2. Bushings 3 and 4 may be suitably interposed between 1 and 2 in well known manner. The total weight of sleeve 2, yoke 6 and pulley 11 is supported by springs 13 mounted on flange 5 which is carried on base 1. Sleeve 2, at its upper end supports a yoke, frame or carriage 6.

A dynamometer 7 of any one of a number of well known constructions is supported within yoke 6, links 8 connecting it, respectively, with the upper part of yoke 6 and with a head 9 secured in the upper end of base 1. The links 8 are arranged to properly operatively support the dynamometer while, at the same time, permitting the necessary travel of yoke 6 relatively to base 1.

The dynamometer 7 is preferably substantially identical with the dynamometer 13 shown in U. S. Patent 2,477,774, and operates in the same manner.

The sleeve 2 rotatably supports the pulley 11 on a suitable stub shaft carried by said sleeve 2, the connection being such that the two travel together. The position of pulley 11 on sleeve 2 is such that, when the equipment is in operative position, the lower run of the pulley channel will be directly above but not contacting the hawser, when the hawser is slack. On the other hand, that position is such that as the slack is taken up the hawser approaches and then engages the pulley. As continued stress straightens the hawser, after such engagement, pulley 11 with sleeve 2 will be correspondingly raised, the maximum travel being reached as the hawser becomes taut and straight. At that time, too, the dynamometer will indicate such condition and that the shown strain or stress should be reduced or, certainly, not exceeded.

To the lower end of sleeve 2 are secured cups or sockets 12 adapted to receive coiled compression, supporting springs 13. For efficiently centering these springs, guide posts or pins 14 are seated in flange 5. Within sockets 12 above springs 13 are disposed small blocks 15, shaped to fit freely within the corresponding spring upper end. A regulating screw 16, threaded through each cup end and abutting against the corresponding block 15 is used to adjust each spring relatively to its cup and to the sleeve end. Or, to put it another way, regulating screws 16 are used to determine the zero setting of the dynamometer indicator hand. Suitable stop nuts 17 may be used to lock screws 16 in adjusted position. While coil springs have been specifically illustrated, it will be obvious that other types of springs, elastic substances, etc., may be substituted. All such are considered as within the field of the present invention and are intended to be covered by this application.

The above described arrangement renders it possible to obtain reliable readings with the dynamometer 7. The entire weight of the outer sleeve 2, pulley 11, frame 6 and associated elements is carried by the coil springs 13, and the lower end of the sleeve 2 is maintained spaced from the flange 5 at all times. The sleeve 2 and associated elements are cushioned during the operation of the device and the springs 13 serve to dampen the vibrations which are set up as the rope or hawser is subjected to rapid fluctuations in tension. The springs absorb the shock thus caused by the variations in tension in the hawser, and the lower end of the sleeve 2 never contacts the flange 5. The sleeve 2 and all parts carried thereby float on the springs 13 at all times, and the vibrations induced by the whipping hawser are materially dampened, as stated. The present invention is a very simple, efficient, compact and inexpensive structure which affords accurate measurements of the tension in the hawser under all conditions.

Changes may be made within the scope of the appended claim without departing from the field of the invention, and it is meant to include all such within this application wherein only one preferred form has been shown by way of illustration.

Having thus described my invention, what I claim and desire to protect by Letters Patent is:

A device for measuring the tension in a flexible element comprising a fixed upright support having a substantially vertical guide portion and provided with a shoulder at the lower end of the guide portion, a sleeve telescopically mounted upon the guide portion and adapted to be raised and lowered, a traction element carried by the sleeve for engagement with the flexible element so that the sleeve is raised when the flexible element is under tension, elements forming sockets secured to the sleeve near its lower end and arranged above said shoulder, compressible coil springs mounted within the sockets and engaging the shoulder and resiliently supporting the sleeve, the elements forming the sockets having screw-threaded openings, adjusting screws mounted within the screw-threaded openings and connected with the springs to vary the tension of the same, a tension measuring instrument secured to the top of the fixed upright support, and a yoke mounted upon the sleeve for movement therewith and extending above the tension measuring instrument and connected with the instrument for causing the instrument to indicate the tension in the flexible element when the sleeve and yoke are elevated.

LAWRENCE C. SANDERS.

REFERENCES CITED

The following references are of record in the file of this patent:

UNITED STATES PATENTS

| Number | Name | Date |
| --- | --- | --- |
| 397,661 | Rood | Feb. 12, 1889 |
| 1,650,603 | Burton | Nov. 29, 1927 |
| 1,855,651 | Roberson | Apr. 26, 1932 |

FOREIGN PATENTS

| Number | Country | Date |
| --- | --- | --- |
| 242,348 | Great Britain | Nov. 6, 1925 |